United States Patent [19]

Koike

[11] Patent Number: 4,965,549
[45] Date of Patent: Oct. 23, 1990

[54] WARNING DEVICE FOR INTERNAL COMBUSTION ENGINE

[76] Inventor: Takashi Koike, 1400 Nippashi-cho, Hamamatsu-shi, Shizuoka-ken, Japan

[21] Appl. No.: 368,941

[22] Filed: Jun. 12, 1989

Related U.S. Application Data

[63] Continuation of Ser. No. 104,046, Oct. 2, 1987, abandoned.

[30] Foreign Application Priority Data

Oct. 3, 1986 [JP] Japan .................................. 61-235797

[51] Int. Cl.$^5$ .......................... G08B 29/00; B60Q 1/00
[52] U.S. Cl. ...................................... 340/516; 340/525; 340/438; 340/441; 340/455
[58] Field of Search ............... 340/516, 525, 438, 441, 340/450–450.3, 455

[56] References Cited

U.S. PATENT DOCUMENTS 4,317,364  3/1982  Asano et al. ...................... 340/52 F
4,447,801  5/1984  Masuda ............................. 340/516

Primary Examiner—Donnie L. Crosland

[57] ABSTRACT

A warning system for an internal combustion engine that is not provided with external source of electric power and which indicates a malfunction or abnormal condition in the engine. The warning system is operated from the engine ignition circuit upon initial starting to provide self checking.

8 Claims, 1 Drawing Sheet

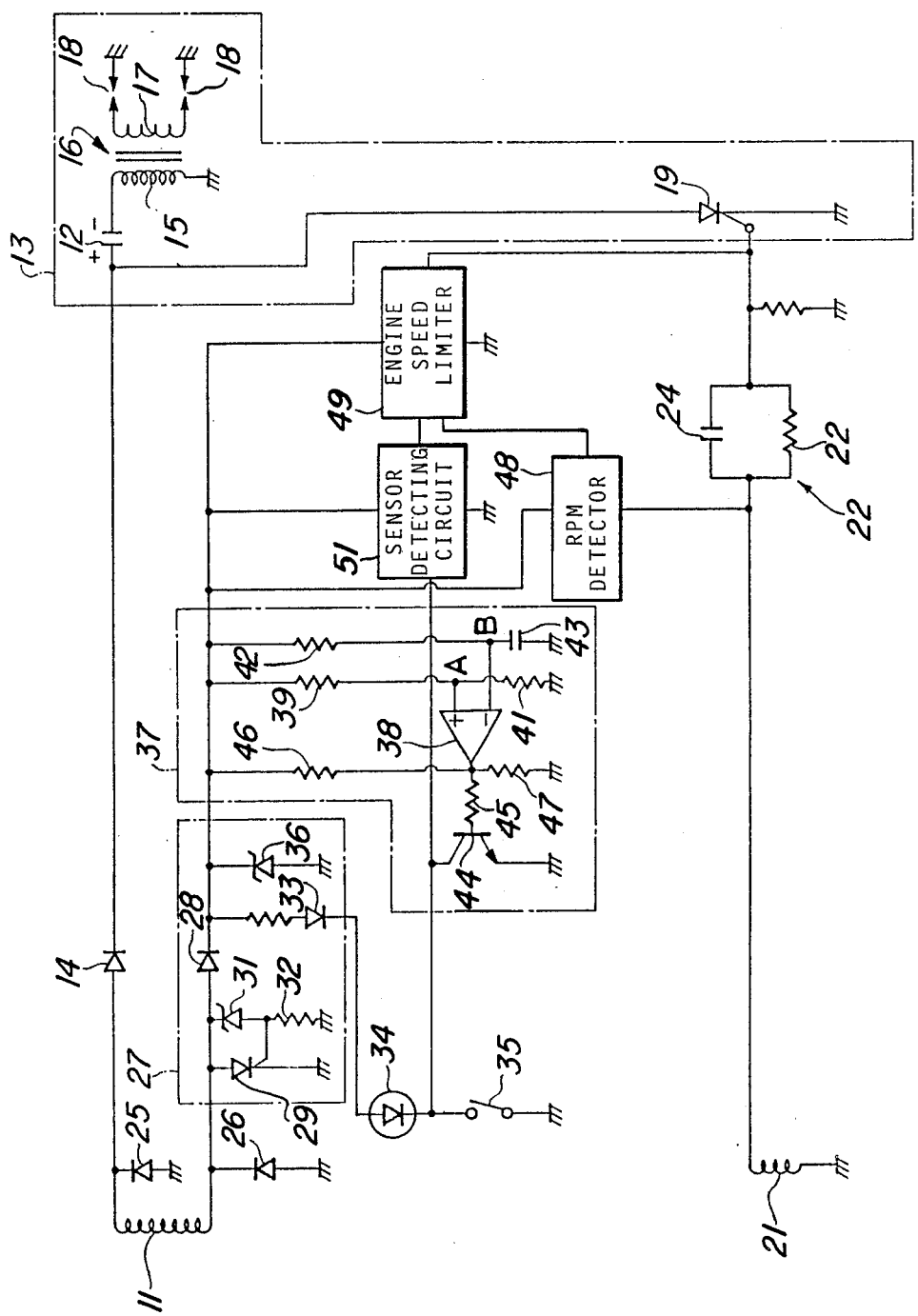

WARNING DEVICE FOR INTERNAL COMBUSTION ENGINE

This is a continuation of U.S. patent application Ser. No. 104,046, filed Oct. 2, 1987, now abandoned.

BACKGROUND OF THE INVENTION

This invention relates to a warning system for an internal combustion engine and more particularly to an improved warning system usable with small engines that do not have external electrical power supplies.

It is well known that many internal combustion engines include warning systems that provide a warning of an abnormal engine condition. Such devices may provide an indication in the event that there is some difficulty with the engine such as overheating, low oil pressure, low oil level, or any of the variety of other features. Where such warning systems are incorporated, it is also a normal practice to provide a self-checking system wherein the warning indicator is activated either when the ignition is turned on or during the starting operation. Although these devices are extremely satisfactory, there are many types of engines which require such warning systems but which do not have the requisite external electrical Power supplies for this self checking. For example, many small internal combustion engines such as low horse power outboard motors do not rely upon external battery power. In fact, such engines may not even have a main power switch. It is desirable, however, to provide warning systems for such engines and also self-checking arrangements for these warning systems.

It is, therefore, a principal object of this invention to provide a warning system for an engine that does not have an external power source.

It is a further object of this invention to provide a self-checking system for the warning system of an engine that is so equipped.

SUMMARY OF THE INVENTION

This invention is adapted to be embodied in a warning system for an internal combustion engine that is not provided with an external source of electrical power. The engine does have generating means that are driven by the engine and an electrically powered warning device for indicating an irregularity in an engine condition. Means are provided for operating the warning device upon initial starting of the engine for self checking.

BRIEF DESCRIPTION OF THE DRAWING

The sole FIGURE of the drawings illustrate an electrical schematic system of a warning device for an internal combustion engine constructed in accordance with an embodiment of the invention.

DETAILED DESCRIPTION OF THE PREFERRED EMBODIMENT

As noted above, the single FIGURE of the drawings illustrates in partially schematic form a warning device for an internal combustion engine that is constructed in accordance with embodiment of the invention. The engine, per se, if not illustrated but it may be of any known type, such as a small displacement outboard motor that is not provided with a separate electrical power source such as a battery.

The engine is spark ignited and includes a magneto generator that incorporates a charging coil 11 that cooperates with a rotating magnet that is affixed to the flywheel (not shown) of the engine in a known manner. The charging coil 11 charges a capacitor 12 of a capacitor discharge ignition circuit, indicated generally by the reference numeral 13 through a diode 14 during one-half wave of the operation. The charging coil 12 is in circuit with a primary winding 15 of a spark coil 16. The spark coil 16 has a secondary winding 17 that fires spark plugs 18 in a known manner when the capacitor 12 is discharged to the ground.

The discharge circuit for the capacitor 12 includes a thyristor 19 which is switched by means of a pulser coil 21 that also forms a part of the magneto generator and which may be activated by the same magnet as that which cooperates with the charging coil 11. The pulser coil 21 supplies a charge to a parallel circuit 22 comprised of a parallel resistor 23 and capacitor 24 so as to gate the thyristor 19 and discharge the capacitor 12 at the appropriate angular position of the engine output shaft.

A pair of diodes 25 and 26 are provided for rectifying the half waves generated at the opposite ends of the winding of the charging coil 11. The diode 26 rectifies the supply of current to a power supply 27 that includes a diode 28, and voltage regulator circuit comprised of diode 29, zener diode 31 and resistor 32. This regulated voltage supply is transmitted through a diode 33 to an indicator light in the form of an LED 34. The indicator light 34 is switched on by an abnormal condition detector switch 35 which is normally opened. Closure of the switch 35 during an abnormal engine condition will effect illumination of the LED 34 when the engine is running to provide an indication of an abnormal engine condition to the operator. As has been previously noted, this abnormal engine condition may be overheating, low oil pressure, low oil level or the like. The power supply circuit 27 includes a further zener diode 36 for voltage stabilization.

The output of the power supply circuit 27 is also provided to an operation checking circuit 37. This checking circuit 37 functions to switch the LED 34 on when the engine is first started and after a predetermined time when the engine reaches a predetermined speed at which the charging coil 11 supplies a voltage greater than a predetermined amount. In order to provide this illumination of this LED 34, there is provided an operational amplifier 38 which acts as a comparator and which has one of its terminals supplied with the fixed reference voltage A through a voltage divider circuit comprised of a pair of resistors 39 and 41. The other terminal of the operational amplifier 38 receives a voltage output signal from the charging coil 11 through a capacitor, resistor timer circuit comprised of a resistor 42 and capacitor 43.

The operational amplifier 38 functions to switch a transistor 44 that is supplied with power through a resistor 45 and voltage divider circuit comprised of resistors 46 and 47.

When the engine is started and begins to run, the charging coil will, during one-half wave, supply power to the operational checking circuit 37 so as to provide a constant voltage signal A to one terminal of the operational amplifier 38 and an increasing voltage signal to the other terminal B. During initial operating condition, this latter voltage will be relatively low and this will cause the operational amplifier 38 to switch on and switch the transistor 44 so as to provide a ground circuit for the LED 34 which will turn it on and provide a self checking of this warning light. After a predetermined time passes, the voltage at the point B becomes higher than that at the point A and then the output of the operational amplifier 38 goes low so as to turn off the transistor 44 and, accordingly, the LED 34.

As has been previously noted, the LED 34 can be turned on when there is an abnormal engine condition through closure of the switch 35 to provide another ground circuit for the LED 34 to indicate abnormal engine condition.

In addition to providing the warning indication in the event of an abnormal engine condition, the device also includes a means for reducing the engine speed under this condition to prevent the likelihood of damage. This engine speed reducing device includes an RPM detector 48 that outputs a signal indicative of engine speed to an engine speed limiting circuit 49. In addition, a sensor detecting circuit 51 inputs a signal to the engine speed limiting circuit 49 when the switch 35 is closed and the LED 34 is illuminated. At this time, the engine speed limiting circuit 49 will reduce the speed of the engine if it is about the preset speed as above a certain preset speed through misfiring of the spark plugs 18 through interruption of the gating of the thyristor 19. Any known type of speed limiting arrangement can be utilized for this purpose.

It should h=readily apparent from the foregoing description that the described arrangement provides a warring system for an engine that has no external power supply such as a battery and which will also provide self checking. The foregoing description is only that of a preferred embodiment of the invention and various changes and modifications may be made without department from the spirit and scope of the invention, as defined by the appended claims.

I claim:

1. A warning system for an internal combustion engine devoid of an external source of electric power, generating means driven by said engine, for generating the sole electric power upon the operation of said engine, an electrically powered warning device for indicating an abnormality in an engine condition, and means for operating said warning device upon the existence of both initial starting of said engine and running of said engine at a speed above a predetermined speed and in the absence of an abnormality in the engine condition for a time period only for self checking of said warning device.

2. A warning system for an internal combustion engine as set forth in claim 1 wherein the warning device is powered by the generating means.

3. A warning system for an internal combustion engine as set forth in claim 1 wherein the means for operating the warning device upon initial starting of the engine operates the warning device until the generating means provides full power output.

4. A warning system for an internal combustion engine as set forth in claim 3 wherein the warning device is powered by the generating means.

5. A warning system for an internal combustion engine as set forth in claim 1 wherein the generating means comprises a magneto generator for firing a spark plug of the engine.

6. A warning system for an internal combustion engine as set forth in claim 5 wherein the means for operating the warning device upon initial starting of the engine operates the warning device until the generating means provides full power output.

7. A warning system for an internal combustion engine as set forth in claim 6 wherein the warning device is powered by the generating means.

8. A warning system for an internal combustion engine as set forth in claim 5 wherein the means for operating the warning device comprises timer means for operating the warning means before the generating voltage becomes a predetermined voltage.

* * * * *